United States Patent
Nell et al.

[11] Patent Number: 5,984,429
[45] Date of Patent: Nov. 16, 1999

[54] ROAD VEHICLE BRAKE SYSTEM ACTUATING DEVICE AND METHOD FOR HOLDING THE VEHICLE STATIONARY ON SLOPED SURFACES

[75] Inventors: Joachim Nell, Hanau; Manfred Steiner, Winnenden, both of Germany

[73] Assignee: DaimlerChrysler AG, Germany

[21] Appl. No.: 08/822,015

[22] Filed: Mar. 24, 1997

[30] Foreign Application Priority Data

Mar. 22, 1996 [DE] Germany .............. 196 11 360

[51] Int. Cl.$^6$ .................................................. B60T 7/12
[52] U.S. Cl. .............................. 303/113.4; 303/155
[58] Field of Search ................... 303/3, 89, 191, 303/113.4, 22.4, DIG. 4, 155

[56] References Cited

U.S. PATENT DOCUMENTS

| | | | |
|---|---|---|---|
| 4,681,196 | 7/1987 | Fulmer et al. | 192/3 H |
| 4,787,205 | 11/1988 | Fontaine | 60/547.1 |
| 4,967,560 | 11/1990 | Konishi . | |
| 5,209,329 | 5/1993 | Sigl et al. . | |
| 5,316,378 | 5/1994 | Maehara . | |
| 5,415,467 | 5/1995 | Utz et al. . | |
| 5,564,797 | 10/1996 | Steiner et al. | 303/113.4 |
| 5,611,606 | 3/1997 | Nell et al. | 303/155 |
| 5,646,841 | 7/1997 | Suzuki et al. | 364/424.098 |

FOREIGN PATENT DOCUMENTS

| | | |
|---|---|---|
| 42 36 240 A1 | 4/1994 | Germany . |
| 43 32 459 A1 | 3/1995 | Germany . |
| 55-4247 | 1/1980 | Japan . |
| 61-257350 | 11/1986 | Japan . |
| 61-287846 | 12/1986 | Japan . |
| 62-83243 | 4/1987 | Japan . |
| 62-88647 | 4/1987 | Japan . |
| 62-258841 | 11/1987 | Japan . |
| 62-275864 | 11/1987 | Japan . |
| 63-31853 | 2/1988 | Japan . |
| 1-218947 | 9/1989 | Japan . |
| 1-262240 | 10/1989 | Japan . |
| 1-306352 | 12/1989 | Japan . |
| 2-124325 | 5/1990 | Japan . |
| 2-171369 | 7/1990 | Japan . |
| 5-85139 | 3/1992 | Japan . |
| 4-232164 | 8/1992 | Japan . |
| WO 89/01887 | 3/1989 | WIPO . |

*Primary Examiner*—Chris Schwartz
*Attorney, Agent, or Firm*—Evenson, McKeown, Edwards & Lenahan, P.L.L.C.

[57] ABSTRACT

In traffic-related stationary phases, a drive ratio of the transmission remains engaged with the engine running on a road vehicle equipped with automatic transmission. The service brake automatically remains activated for a short time after the vehicle has come to a halt as a result of a targeted braking operation. Thereby, the driver is allowed to remove his/her foot from the brake pedal, and the vehicle can be held stationary in a reliable manner on a flat or sloping road surface. This holding braking mode of the vehicle service brake system is cancelled when the driver actuates the accelerator pedal whose position is monitored by a switch.

24 Claims, 2 Drawing Sheets

ROAD VEHICLE BRAKE SYSTEM ACTUATING DEVICE AND METHOD FOR HOLDING THE VEHICLE STATIONARY ON SLOPED SURFACES

BACKGROUND AND SUMMARY OF THE INVENTION

This application claims the priority of DE 196 11 360.1, the disclosure of which is expressly incorporated by reference herein.

The present invention relates to a device for automatic actuation of a hydraulic brake system of a road vehicle for the purpose of maintaining a vehicle stationary for the duration of traffic-related stationary phases by coupling brake pressure from a brake-pressure source which can be activated without the cooperation of the driver into at least one, and preferably all, of the wheel brakes of the vehicle.

DE-43 32 459 A1 describes an actuating device for a road vehicle with an automatic transmission. The known actuating device has a brake-pressure control device. By processing sensor output signals of a sensor arrangement in accordance with plausibility criteria while the engine is running and with the vehicle in a stationary condition achieved after a braking operation, automatic continuation of the stationary braking operation is provided. After a delay time period, δt, of defined length since the time the vehicle came to a halt has passed, a brake pressure sufficient to keep the vehicle reliably in the stationary condition is coupled into the wheel brake(s) used for the stationary braking operation.

Here, a signal which triggers the stationary braking mode is obtained from a conjunctive (AND logic) linking of the following signals:

(a) An output signal of an electronic speed or wheel-speed sensor, characteristic of the stationary condition of the vehicle, (b) an output signal of an electronic engine speed transmitter and/or a pressure sensor which monitors the pressure at the inlet branch of the vehicle, as an information signal for a running engine, (c) an output signal characteristic of the actuated state of the brake pedal, and the output signal of the brake light switch and/or that of an electronic pressure transducer by way of which the pressure in at least one of the wheel brakes can be detected, and (d) an output signal of a transmission-ratio transmitter.

The release of the brakes required upon resumption of the driving mode is controlled by the control device, which, from a redundant combination of sensor output signals, e.g. those of an accelerator-pedal position transmitter and a throttle-valve position sensor or an engine-speed sensor, detects the driver's desire for resumption of the driving mode.

The known actuating device is designed so that the driver is initially merely assisted in actuating the brakes. After the expiration of a delay time period which is in practice short, i.e. 1 to 2 seconds, however, the brake pressure is increased to such an extent that the vehicle is held stationary in a reliable manner, even on a hill, and the driver can take his or her foot from the brake pedal. The brake is released again only when the driver actuates the accelerator pedal and the throttle-valve position sensor produces a signal characteristic of this.

In stationary phases at traffic-light-controlled crossroads or in slow-moving motorway traffic involving numerous stationary phases, the known actuating device provides the desired relief for the driver. However, the automatic activation of a stationary braking operation with a relatively high braking force is problematic in parking situations, especially on an inclined road surface. This occurs for example, in reverse parking, the driver, after having placed his or her vehicle next to the vehicle in front, would like to allow the vehicle to roll backwards with a forward drive ratio engaged in order to avoid the engagement of the reverse drive ratio but there is an associated risk that the vehicle will start to roll with a jerk as soon as the accelerator pedal is actuated. On a flat road surface, too, parking of the vehicle when a number of changes between forward and reverse travel are required can be made more difficult by the actuating device.

It is, therefore, an object of the present invention to improve an actuating device in such a way that, without prejudice to required triggering of stationary braking-mode phases, parking operations can be carried out in a simple and reliable manner.

This object has been achieved according to the present invention by providing that the brake-pressure control device is configured to trigger the automatic stationary braking mode only if, within the delay time period, the driver performs an actuating action which can be recognized as a driver's desire for triggering of automatic stationary braking and is detectable by the sensor arrangement, and provides the ending of the automatic stationary braking mode only if, in addition to the sensor output signals of the sensor arrangement which reveal the driver's desire for resumption of the driving mode, there are also present sensor output signals which, again with reference to or initiation actuation criteria, fulfill safety-relevant secondary conditions.

According to the present invention, the triggering of the otherwise automatic stationary braking mode takes place only when the driver himself/herself performs an actuating action within the delay time period, δt, preferably increasing the brake pressure by a minimum amount of about 5 bar by actuation of the brake pedal. The additional effort required for actuation in this situation is marginal because the driver is, in any event, still actuating the brake pedal. It is perfectly reasonable to expect this of the driver in view of the advantage that an automatic stationary braking operation is only carried out when the driver expressly so intends. This also applies if the driver additionally or alternatively actuates a switch designed, for example, as a momentary-contact switch and hence gives an electronic control unit a command pulse which clearly expresses the driver's intention, an intention which can, as it were, still be "expressed", i.e. made effective, after expiration of the delay time period.

Whenever the automatic stationary braking mode is activated, it is advantageous if the occurrence of a speed signal of a velocity (or v) sensor triggers an automatic increase of the braking force until the stationary condition of the vehicle has been achieved again. The brake-pressure increase required for this takes place in steps of about 5 bar in each case. In a preferred configuration of the brake-pressure control device, an additional brake-pressure raising step takes place after the stationary condition of the vehicle has been achieved again. The automatic stationary braking mode ends only if, in addition to sensor output signals of the sensor arrangement which reveal the driver's desire for resumption of the driving mode, there are also present sensor signals which, again with reference to plausibility criteria, signal the fulfillment of safety-relevant secondary conditions, in particular that the bonnet or hood is closed, the driver's seat is occupied and the doors of the vehicle are closed. If one of these conditions is not met, the driver is warned by an acoustic or optical signal, and the driving mode cannot be effected.

Components of the service brake are used to maintain a stationary condition of the vehicle achieved by a targeted braking operation, e.g. by driving inlet valves of an anti-lock system present on the vehicle into their brake-pressure-holding position or by switching solenoid valves. Thereby, the brake circuits of the vehicle are connected to the associated pressure outputs of the brake master cylinder, into their shut-off position, with an advantageously low outlay on electronic and/or electrohydraulic circuitry.

A configuration of the actuating device which is functionally reliable and simple in terms of circuitry is also possible by providing a hydraulic auxiliary pressure source which can be activated by driving the actuating device with an output signal of the electronic control unit and the output pressure of which can be coupled into at least one of the brake circuits for the duration of the automatic stationary braking mode.

In a preferred configuration of the actuating device, the service brake system of the vehicle is activated in the automatically controlled stationary braking mode by driving its pneumatic brake booster.

In the automatic stationary braking mode of the brake system, it is particularly advantageous if the brake pressure used for this purpose is limited to ensure that this pressure can be dissipated again with sufficient rapidity upon the transition to the driving mode.

As an alternative, or in addition to the possibilities mentioned for producing braking force in the stationary braking mode, it is also within the contemplation of the present invention to provide an electric-motor-type or electrohydraulic or electropneumatic actuating element which can be driven by an output signal of the electronic control unit and by way of the driving of which the parking brake of the vehicle can be activated.

In a preferred configuration of the actuating device, an introductory brake-pressure build-up for the stationary braking mode can be followed by the ending of this pressure build-up because the vehicle can be held stationary by the "locked-in" brake pressure maintained in the wheel brakes. It can be expedient here if pressure-build-up cycles with following holding cycles are repeated from time to time, e.g. at one-minute intervals.

If the brake-pressure dissipation which concludes the automatic stationary braking mode is effected by multiple pulsed switching of the change-over valve assigned to the brake circuit used for the stationary braking operation, potential pressure surges and the associated generation of noise can be moderated. This occurs upon the transition from the stationary braking mode to the driving mode, where the electronic control unit first produces a control signal which effects an increase of the output pressure of the brake unit and only then produces the sequence of pulses which serves to drive the respective change-over valve and produces the brake-pressure reduction.

A brake-pressure dissipation which is rapid but nevertheless associated with comparatively little noise generation when driving away again is also achieved, in a vehicle which is equipped with an anti-lock system which operates on the return-pumping principle. This is achieved by the return pump(s) of the system and its brake-pressure regulating valves being driven into the pressure reduction mode for a minimum time period.

The high transmission or drive-ratio reduction makes it advantageous, particularly when ending the automatic stationary braking mode by a transition into the reversing mode, for the brake-pressure dissipation to take place in steps of about 5 bar in order to avoid jerky driving away of a vehicle.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
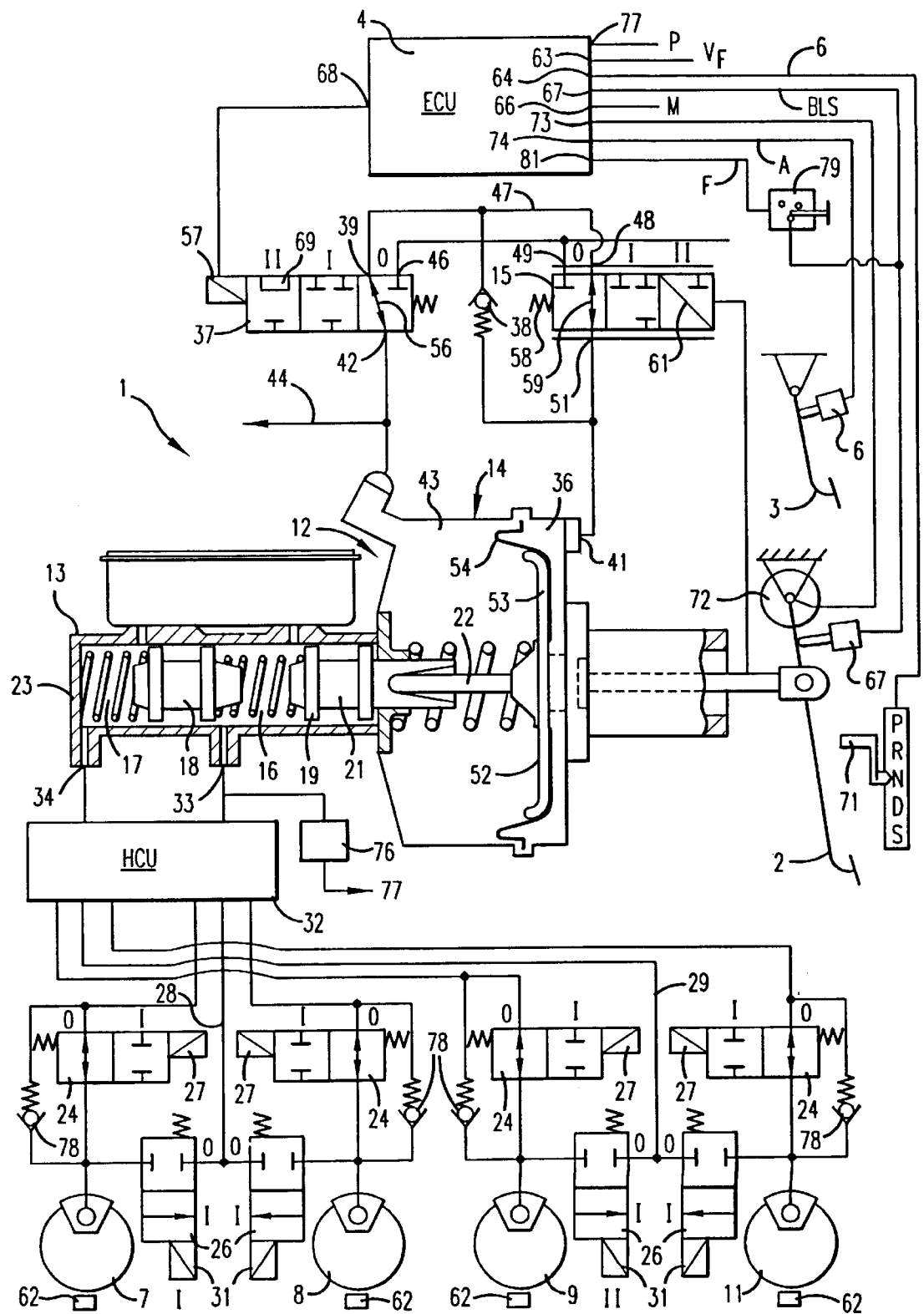
FIG. 1 is an electrohydraulic schematic diagram of a road vehicle service brake system equipped with a device according to the invention, an anti-lock system and a device for triggering automatic full braking.

The service brake system denoted generally by numeral 1 in FIG. 1, represents in overall terms a road vehicle equipped with an automatic transmission which can be coupled to the vehicle engine by, for example, a hydraulic torque converter. The drive line of the vehicle, which is assumed to have a rear-axle drive, is not shown for the sake of clarity and simplicity.

It is further assumed for the vehicle in the specific embodiment illustrated that a brake-pressure control device is provided which, from the way in which the driver actuates the brake system designated generally by numeral 1 by way of the brake pedal 2, "recognizes" whether the driver is intending to perform targeted braking, which can be carried out with moderate vehicle deceleration, or full braking with as great as possible vehicle deceleration. In the latter case, the control device automatically controls the development of a suitable, high braking force, which the driver would not be able to feed in with sufficient rapidity merely by actuating the brake pedal 2.

The brake system 1 including its brake-pressure control device is furthermore configured so that, in stationary phases of the vehicle due to traffic, e.g. when stopping in front of a traffic light (i.e., in a situation in which, if the vehicle was fitted with a conventional brake system, the driver would have to hold it stationary by actuating the brake system 1 to ensure that it did not tend to roll away on a flat or sloping road), the system 1 automatically initiates the relevant brake actuation function and releases the brakes of the vehicle activated in this way again as soon as the driving mode is resumed by actuation of the accelerator pedal 3. An electronic control unit 4 in the embodiment illustrated, is provided for controlling these functions and detects this from the fact that an electric switch 6, which is provided for the purpose of monitoring the initial position of the accelerator pedal 3, changes its state in the initial phase of the movement of the accelerator pedal 3.

In the brake system 1, the front-wheel brakes 7, 8 are combined to form a brake circuit I, and the rear-wheel brakes 9, 11 are combined to form a brake circuit II. The brake unit of the brake system 1 is denoted generally by numeral 12, and comprises a tandem master cylinder 13 and a pneumatic brake booster 14. The force multiplication of the booster 14 can be controlled by the brake pedal 2 via a proportional valve 15.

The tandem master cylinder 13 has a primary outlet pressure space 16 assigned to the front-axle brake circuit I and a secondary outlet pressure space 17 assigned to the rear-axle brake circuit II. These pressure spaces 16, 17 are divided off pressure-tightly from one another in a manner which allows axial movement by a floating piston 18. The second axial boundary of the primary outlet pressure space 16 is formed by a primary piston 21 which can be moved axially in a pressure-tight manner in the master cylinder casing 19 and on which the actuating force multiplied by the pneumatic brake booster 14 engages by a push rod 22. The second axial boundary of the secondary outlet pressure space 17 is formed by an end wall 23 of the master cylinder casing 19.

In the illustrated embodiment chosen for explanation, the vehicle is assumed to be fitted with an anti-lock system operating on the return-pumping principle, and constructed and operating in a manner known per se. Inlet valves 24 and outlet valves 26 are assigned individually to the wheel brakes 7, 8, 9 and 11. These valves are constructed as 2/2-way solenoid valves which can be driven by output signals of the electronic control unit 4, which also controls the anti-lock control function.

As the spring-centered initial position 0, the inlet valves 24 have a throughflow position, which is assigned to brake-pressure build-up and brake-pressure dissipation phases of a normal braking operation (i.e. a braking operation not subject to anti-lock control), and to brake-pressure restoration phases of a braking operation subject to anti-lock control. A shut-off position I is assumed upon excitation of associated switching magnets 27 with an output signal of the electronic control unit 4 and is assigned to brake-pressure maintenance and brake-pressure dissipation phases of a braking operation subject to anti-lock control.

As a spring-centered initial position 0, the outlet valves 26 have a shut-off position, in which the wheel brakes 7, 8, 9 and 11 are each shut off from respective return lines 28 and 29 of the front-axle brake circuit I and of the rear-axle circuit II. Upon excitation of their switching magnets 31 with a respective output signal of the electronic control unit 4, the outlet valves 26 assume a throughflow position I as their position, in which the respective wheel brake 7, 8, 9, 12 is connected to the return line 28 or 29 of the respective brake circuit I or II and brake fluid can flow off to a low-pressure reservoir (not shown) assigned to the respective brake circuit.

The low-pressure reservoir and return pumps assigned individually to the respective brake circuits I, II are arranged in a hydraulic connection unit 32, indicated schematically in FIG. 1, which provides the hydraulic connection between the front-wheel brakes 7, 8, and, on one hand, the rear-wheel brakes 9, 11, and on the other hand, the pressure outlets 33, 34, assigned respectively to the front-axle brake circuit I and the rear-axle brake circuit II, of the tandem master cylinder 13. Via the pressure outlets 33, 34, the brake pressure can be coupled into the wheel brakes 7, 8, 9, 11, and brake fluid discharged from the latter can be pumped back into the tandem master cylinder 13 by the return pumps of the hydraulic connection unit 32.

A more detailed explanation of this anti-lock system 24, 26, 32, which can be implemented in a multitude of different ways known from conventional technology, is unnecessary because, fundamentally, any type of anti-lock system in which brake-pressure regulating valves 24, 26 assigned individually to the wheel brakes 7, 8, 9, 11 are provided is suitable in conjunction with the brake-pressure control device according to the present invention.

Both the brake actuation which, as it were, continues an automatically controlled full braking operation triggered by the driver actuating the brake pedal 2 at a rate $\dot{\phi}$ higher than a particular threshold value $\dot{\phi}_s$, and that which, as it were, continues a targeted braking operation that has led to the vehicle coming to a halt, which are intended to prevent the vehicle from rolling away from the stationary condition, are achieved in the exemplary embodiment chosen for explanation by activating the brake booster 14. Thereby, a higher pressure is coupled into the booster input chamber 36 than that which the driver has coupled into the input pressure space via the proportional valve 15 by actuating the brake pedal 2.

Coupling in of pressure into the booster input chamber 36 is accomplished by a brake-pressure control valve 37. A pressure-controlled 2/2-way valve 38, which is shown as a nonreturn valve, is inserted between a control connection 39 of the brake-pressure control valve 37 and an inlet connection 41 of the booster input chamber 36. The valve 38 switches to its throughflow position when the pressure at the control connection 39 is higher than at the booster inlet connection 41, and otherwise performs a shut-off function. The brake-pressure control valve 37 also has a vacuum connection 42 which is in permanent communication with the vacuum chamber 43 of the pneumatic brake booster 14. The chamber 43, for its part, is connected permanently to the air inlet branch of the vehicle engine (not shown) via a "suction" line 44.

The brake-pressure control valve 37 also has an "atmospheric connection" 46 to which the atmospheric ambient pressure is applied. The control connection 39 of the brake-pressure control valve 37 is connected via a low-pressure line 47 to a low-pressure connection 48 of the proportional valve 15. The proportional valve 15 likewise has an atmospheric connection 49, to which the atmospheric ambient pressure is permanently applied.

The proportional valve 15 has a control connection 51 in permanent communication with the booster input chamber 36. The chamber 36 is divided off pressure tightly with respect to the vacuum chamber 43 of the brake booster 14, but in a manner which allows movement by the brake booster piston denoted generally by numeral 52. This piston 52 is formed by a dimensionally stable, cup-shaped piston element 53 which engages via the push rod 22 on the primary piston 21 of the tandem master cylinder 13 and by a rolling diaphragm 54 which provides the pressure-tight and mobile connection between this piston element 53 and the casing of the brake booster 14 and also forms the boundary of the input chamber 36 with respect to the brake booster vacuum chamber 43.

The brake-pressure control valve 37 has a spring-centered initial position 0, in which its low-pressure connection 42 is connected to its control connection 39 via a throughflow path 56 freed in this initial position 0 and its atmospheric connection 46 is shut off from the vacuum connection 42.

The brake-pressure control valve 37 can be driven into a functional position I by excitation of its control magnet 57 with an output signal of the electronic control unit 4 having a defined current intensity of, for example, 3 A. In position I, all the connections 39, 42, 46 of the brake-pressure control valve 37 are shut off from one another. The valve 37 can be driven into a functional position II by excitation with an output signal of defined, higher current intensity of, for example, 6 A from the electronic control unit 4. In position II, the control connection 37 and the atmospheric connection 46 of the brake-pressure control valve 37 are connected to one another via a throughflow path 69 freed in this functional position II, but in which these connections are shut off from the vacuum connection 42 of the brake-pressure control valve 37.

The proportional valve 15 has an initial position 0 which is centered by a resilient return element 58 and in which its control connection 51 is connected to the low-pressure connection 48 and shut off from the atmospheric connection 49. Via a throughflow path 59 freed in this initial position 0 of the proportional valve 15, the atmospheric ambient pressure can be coupled into the input chamber 36 of the brake booster 14 if, at the same time, the brake-pressure control valve 37 has been switched into its functional position II.

The proportional valve 15 can be driven, by actuation of the brake pedal 2, into a functional position II, in which the atmospheric connection 49 of the proportional valve 15 is connected via a throughflow path 61 to the control connection 51 of the valve, but the connection is shut off from the low-pressure connection 48 of the proportional valve. The functional position II of the proportional valve 15 is assigned to the dynamic brake-pressure build-up mode of the brake booster 14, in which the actuating force which leads to the actuation of the tandem master cylinder 13 in the sense of a brake-pressure build-up in the wheel brakes 7, 8, 9 and 11 is set by subjecting the input chamber 36 to the ambient pressure.

The functional position I of the proportional valve 15 is a shut-off position, in which all the connections 48, 49, 51 of this valve 15 are shut off from one another. This functional position corresponds to a static state of equilibrium, in which the brake pressure fed into the activated wheel brakes corresponds to the driver's intention, i.e. the driver is holding the brake pedal 2 in a defined position.

To explain a contemplated operating mode of the brake system 1 by which the vehicle is held reliably in the stationary condition after being braked to a halt, the situation assumed is one in which the vehicle has just come to a halt by a targeted braking operation and the driver is still holding the brake pedal 2 actuated with a force $K_p$. Thereby, the brake pressure maintained in the wheel brakes 7, 8, 9, 11 is just sufficient to hold the vehicle stationary against the torque acting on the driven vehicle wheels via the engaged automatic transmission when the engine is idling.

The electronic control unit 4, needs explanation by reference only to its functional aspects because its implementation with electronic circuitry is well within the skill of the person in this art, given a knowledge of these functional aspects and their purpose. The situation of the vehicle coming to a halt can be recognized by the unit 4 from the fact, for example, that (i) the vehicle is stationary,
(ii) a transmission position for forward or reverse travel has been selected or the transmission is in the idling (N) position and
(iii) the engine is running.

Because conditions (i), (ii) and (iii) can only be present, given a moderately or steeply rising, flat or falling road surface, if, at the same time, (iv) the brake system 1 has also been actuated by the driver, it is expedient to include this condition (iv) as a criterion for the recognition of the initial situation described.

Electric signals characteristic of the above-enumerated individual conditions (i) to (iv), from the processing of which in the sense of conjunctive logic interlinking (AND interlinking), the electronic control unit 4 can recognize the initial situation are, for example, the signals, of wheel-speed sensors 62 which are assigned individually to the vehicle wheels and the output signals of which contain, in their level and/or frequency, the information on the speed of the vehicle wheels and hence also of the vehicle, i.e. signals characteristic for the state of motion of the vehicle.

Assuming that the electronic control unit 4 also provides the control of the anti-lock control function of the anti-lock system, the output signals at the wheel-speed sensors 62 are each fed to one input of the electronic control unit 4. Of these inputs, for ease of illustration, the only one shown is a representative "speed", ($v_F$), input 63.

The information on the transmission can be obtained, for example, from the output signal of a position transmitter monitoring the position of the selector lever 71 of the automatic transmission and/or from drive signals by which the automatic transmission is electronically driven. The relevant information input is indicated schematically in the drawing by a "transmission", (G), input 64 of the electronic control unit.

A signal characteristic of the engine operating state, from which it is possible to detect whether the engine is or is not running (condition (iii)) is, for example, the output signal of an engine speed transmitter or some other element of an engine control system. This can likewise be provided by the electronic control unit 4, for example the output signal of an electronic or electromechanical pressure transducer which monitors the pressure at the air inlet branch of the vehicle engine. The processability of a signal characteristic of the operating state of the engine is indicated schematically by an "engine", (M), input 66 of the electronic control unit.

The functional state, both actuated and unactuated, of the brake system 1 can be detected, on one hand, from the output signal of the brake light switch which is applied to a BLS input 67 of the electronic control unit 4 as a high-level voltage signal when the brake system is actuated by the driver and as a low-level (0 volt) signal when the brake system is unactuated. The functional state is also detectable from the output signal of an electronic or electromechanical pressure sensor 76 which is fed to the electronic control unit 4 at a pressure (P) input 77. This pressure-sensor output signal also contains the data as to the prevailing pressure in the primary output pressure space of the master cylinder.

To ensure that an automatic stationary braking operation is triggered, the driver must increase the brake pressure, at least briefly, by actuating the brake pedal within a delay time period, δt, of around 2 seconds (anywhere between 1.5 and 5 seconds) after the vehicle has come to a halt. If this increasing action by the driver takes place within the delay time period, a drive signal is emitted at a control output 68 of the electronic control unit 4, and thereby the brake-pressure control valve 37 is switched into its functional position II. In that position, the atmospheric connection 46 of the brake-pressure control valve 37 is connected to the control connection 39 of the latter via the throughflow path 69, which is freed in this functional position II, and the atmospheric ambient pressure is coupled into the input chamber 36 of the pneumatic brake booster 14 at least via the nonreturn valve 38, irrespective of the functional position in which the proportional valve 15 is located. In addition, the vacuum chamber 43 of the booster is simultaneously shut off both from the atmospheric connection 46 and from the control connection 39 of the brake-pressure control valve 37, with the result that the brake booster 14 is automatically driven in the sense of a brake-pressure increase in the wheel brakes 7, 8, 9 and 11 connected to the master cylinder 13.

In the service brake system 1 described thus far, the driver can detect its transition to the stationary braking mode from the fact that the brake pedal 2 yields briefly in the actuating direction and can then remove his or her foot from the brake pedal. It is also within the contemplation of the present invention to use the output signal, linked to the yielding of the pedal 2, of a pedal position (φ), i.e. sensor 72, which is fed to the electronic control unit 4 at a φ input 73, for a display to be driven which signals to the driver, additionally in the illustrated embodiment, the stationary mode of the service brake 1.

In this type of operational control, the pressure coupled into the wheel brakes 7, 8, 9 and 11 to hold the vehicle in the stationary condition after the driver has taken his or her foot from the brake pedal 2 corresponds to the pressure obtained solely by driving the brake booster 14 up to its operating limit. That is, atmospheric ambient pressure prevails in its input chamber 36, while the pressure level in the low-pressure chamber 43 corresponds to the pressure at the air inlet branch of the vehicle engine, and the driver is no longer involved in the brake-pressure build-up. A typical value of the brake pressure effective in this case is 80 to 100 bar.

Starting from an operating situation of the vehicle in which a forward or reverse gear of the automatic transmission has been selected and the automatic stationary braking mode of the brake system 1 has been activated, the following conditions must also, for safety reasons, have cumulatively been met for its ending by actuation of the accelerator pedal 3, it being possible for the electronic control unit 4 to check these conditions by way of output signals of sensors which are not shown for the sake of simplicity:

(1) the bonnet or hood must be closed,
(2) the vehicle doors must be closed, and
(3) the driver's seat must be occupied.

If one of the foregoing three conditions is not met, a warning display is activated, and deactivation of the automatic stationary braking mode is excluded.

Starting from situations in which the idling (N) or parking (P) position of the automatic transmission has been selected, the automatic stationary braking mode can in each case be ended by actuation of the parking brake, or, alternatively, by actuation of a system off switch. The functional state of the parking brake or system off switch is likewise monitored by a sensor. If, with the vehicle stationary, neither the parking brake nor the system off switch has been actuated, and the driver's seat enquiry shows that the driver's seat is unoccupied, a warning signal is likewise triggered. Even where one of the forward gears or the reverse gear has been selected but the accelerator pedal has not been actuated, the automatic stationary braking mode is ended by actuation of the system off switch. In this case too, however, deactivation of the stationary braking mode is not possible if the bonnet is open.

In the traffic situation assumed for the explanation of the automatic stationary braking mode, namely stopping at a traffic light, this stationary braking operation is ended by the actuation of the accelerator pedal 3. The electronic switch 6 responds to this pedal actuation with the emission of an output signal of a defined, e.g. high, signal level which is fed to the electronic control unit at a driveway (A) input 74. The output signal of this accelerator-pedal switch 6, which can have a similar structure to that of the brake light switch 67, triggers the ending of the automatic stationary braking mode and thereby cancels the driving of the brake-pressure control valve 37 again. The valve 37 is thereby switched back to its initial position 0. As a result, the input pressure space 36 of the brake booster 14 is vented via the proportional valve 15, likewise situated in its initial position 0, and via the brake-pressure control valve 37. The piston 52 of the brake booster 14 returns to its illustrated initial position, that corresponding to the unactuated state of the master cylinder 13, and the wheel brakes 7, 8, 9 and 11 are relieved of pressure, allowing the vehicle to be driven away.

It is advantageous here, especially when the termination of the stationary braking mode takes place by transition into the reversing mode in which the greatest gear reduction is effective, to lower the brake pressure comparatively slowly, e.g. in steps of 5 bar in each case, in order to avoid jerky driving away.

Moreover, for reasons of comfort, a limitation of the pressure coupled into the wheel brakes 7, 8, 9 and 11 in the automatic stationary braking mode to a value sufficient to maintain the stationary condition of the vehicle is desired. This is desired for reasons of more rapid pressure relief of the wheel brakes when driving away, and is possible because, as soon as a defined value of the brake pressure has been achieved after the vehicle has come to a halt and the brake booster 14 has been activated, the inlet valves 24 are switched to their shut-off positions I.

In practice, a brake pressure produced at the pressure outlets 33, 34 of about 40 bar is sufficient in all conceivable situations. If the vehicle nevertheless starts to roll, an additional supply can be provided, i.e. the brake pressure increased again.

A signal suitable for triggering a control operation of this kind contains information on the absolute value of the pressure coupled into the wheel brakes 7, 8, 9 and 11. This information can be evaluated by the electronic control unit 4. The signal is, for example, the output signal of the pedal position (φ) sensor 72, which is a direct measure of the angle φ about which the brake pedal 2 is pivoted when actuated relative to its initial position. This assumes, of course, that the brake pedal 2 is nonpositively coupled in terms of motion to the piston 52 of the brake booster 14 and, via the latter, to the primary piston 21 of the tandem master cylinder 13.

The output signal of the pressure sensor 76 varies continuously with the output pressure applied to the pressure output 33 of the primary output pressure space 16 of the master cylinder 13 and is in clear correlation with this output pressure. This output signal is also suitable in this respect, i.e. for triggering the control operation. In this type of brake-pressure control in the stationary braking mode of the brake system 1, the brake booster 14 of the system remains driven for the duration of the stationary braking operation in order to prevent the brake pressure coupled into the wheel brakes 7, 8, 9 and 11 from being dissipated via the nonreturn safety valve 78 connected in parallel with the shut-off inlet valves 54.

An advantageous type of brake-pressure control is also within the scope of the present invention by coupling the maximum pressure achievable by driving the brake booster 14 only into the wheel brakes 9, 11 of the driven rear wheels of the vehicle and by subjecting only the front-wheel brakes 7, 8 of the vehicle to a pressure reduced relative to this maximum achievable brake pressure by shutting off their inlet valves 24 or to no pressure at all.

The stationary braking mode of the brake system 1 can also be triggered, irrespective of an activation of the electronic control unit 4 to control its timing, by actuation of a switch 79 by the driver after he or she has brought the vehicle to a halt. Thereby, the production of a high-level pulse is triggered and fed to the electronic control unit 4 at a holding (F) input 81 which is activated to control a stationary braking operation which can proceed according to one of the ways explained above. The stationary braking operation can be ended by renewed actuation of this switch 79 or by actuation of the accelerator pedal 3 and the associated response of the electronic switch 6 which monitors the position of the accelerator pedal.

A result corresponding to the purpose of the present invention can also be achieved by an automatic actuation of the parking brake (not shown) of the vehicle or by activation of a vehicle-dynamics control device which acts on the wheel brakes 7, 8, 9 and 11 of the vehicle. The result is either recognized "automatically" by the electronic control unit 4 or controlled by actuation of the switch 79 by the driver. The above-mentioned vehicle-dynamics control device is configured so that brake pressure can be built up, held and/or dissipated again at one or more wheel brakes of the vehicle without the cooperation of the driver. This result is achieved either by the activation of a pneumatic or hydraulic brake booster of the brake system, whereby a brake master cylinder can be actuated. The result is also achieved by driving the pressure supply unit formed by the return pumps of the anti-lock system and constituting the functional element of the hydraulic connection unit 32 to allow brake pressure to be coupled into the wheel brakes 7, 8 and/or 8, 11, provided for the maintenance of a stationary phase of the vehicle, when the conditions (i) to (iv) explained at the outset have been met and the driver's own activity has indicated his or her desire for an otherwise automatic stationary braking operation.

Figure 2:
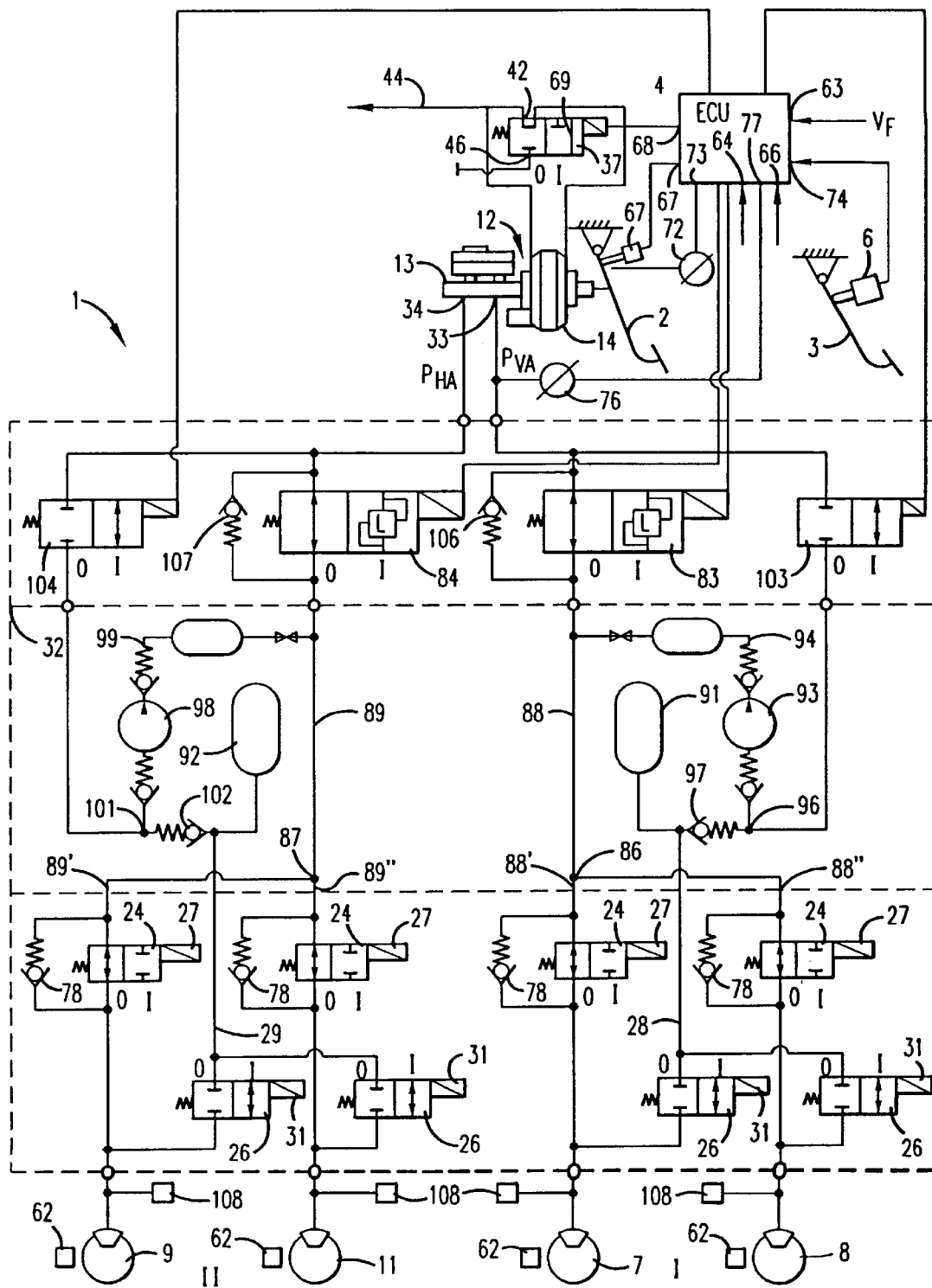
FIG. 2 is an electrohydraulic schematic diagram of another embodiment of a device according to the present invention for a vehicle which is also fitted with a vehicle-dynamics control system.

To explain structural and functional details of an exemplary embodiment relevant to this, attention is now drawn to FIG. 2. There the brake system 1' of a road vehicle is shown which is equipped with a device for vehicle-dynamics control which, operating on the basis of conventional criteria and algorithms is implemented essentially by the hydraulic connection unit 32 and the functionally appropriate configuration of the electronic control unit 4 of the brake-pressure control device.

Insofar as elements of FIG. 2 are provided with reference numerals which are not specifically mentioned in the following description of the brake system 1' but are identical with reference numerals used in FIG. 1, this indicates structural and functional identity, or substantial similarity, between the elements with identical designations and to avoid a repetitious, discussion of structure which has already been described with reference to FIG. 1. The description of brake system 1' can therefore be restricted essentially to an explanation of its connection unit 32 which provides the hydraulic connection of the brake unit 12 to the valve block comprising the inlet valves 24 and the outlet valves 26 of the anti-lock system and denoted generally by numeral 82.

The hydraulic connection unit 32 comprises change-over valves 83, 84 which are inserted between the respective pressure outlets 33, 34 of the tandem master cylinder 13 and the branch locations 86, 87 of the main brake lines 88, 89 of the front-axle brake circuit I and the rear-axle brake circuit II. At the branch locations 86, 87, the main brake lines 88, 89 branch to form the brake line branches 88', 88" and 89', 89", respectively, leading to the individual wheel brakes, a low-pressure reservoir 91 to which the return line 28 of the front-axle brake circuit I is connected, and a low-pressure reservoir 92 to which the return line 29 of the rear-axle brake circuit II is connected. Also connected are an electrically driveable hydraulic pump 93 which can be operated at a high output pressure level and the (high-) pressure output 94 of which is connected to the main brake line 88 of the front-axle brake circuit I and the (low-pressure) input 96 of which is connected via a nonreturn valve 97, acted upon in the opening direction by a higher pressure in the pressure reservoir 91 connected to the return line 28 than at the low-pressure input 96 of the pump 93 and otherwise shut off, to the return line 28 and the pressure reservoir 91.

Likewise, an electrically driveable hydraulic pump 98 which can be operated at a high output pressure level has a high-pressure output 99 connected to the main brake line 89 of the rear-axle brake circuit I and the low-pressure input 101 connected via a nonreturn valve 102, which is acted upon in the opening direction by a higher pressure in the pressure reservoir 92 connected to the return line 29 of the rear-axle brake circuit II than at the low-pressure input 101 of the pump 98 and is otherwise shut off, to the return line 29 and the pressure reservoir 92 of the rear-axle brake circuit II.

A precharging control valve 103 is configured as a solenoid valve and is inserted between that pressure output 33 of the tandem master cylinder 13 which is assigned to the front-axle brake circuit I and the input 96 of the hydraulic pump 93 of the front-axle brake circuit I. Likewise, a precharging control valve 104 is also configured as a solenoid valve and is inserted between that pressure output 34 of the tandem master cylinder 13 which is assigned to the rear-axle brake circuit II and the input 101 of the hydraulic pump 98 assigned to the rear-axle brake circuit II.

Two nonreturn valves 106, 107, which are assigned individually to the two brake circuits I and II, are connected in parallel with respective change-over valve 83 or 84 and are acted upon in the opening direction by a higher pressure at the respective pressure output 33 or 34 of the tandem master cylinder 13 than in the connected main brake line 88 or 89 and are otherwise shut off.

The change-over valves 83, 84 have spring-centered open position as the initial position 0. In this position, brake pressure can be coupled into the brake circuits I and II by actuation of the tandem master cylinder 13, and the valves 83, 84 can be switched into an excited shut-off position I by output signals of the electronic control unit 4, additionally acting in this position, as indicated by a corresponding valve symbol, as pressure-limiting valves so that a pressure which can be produced by activation of the hydraulic pumps 93, 98 in the front-axle brake circuit I and/or in the rear-axle brake circuit II can be limited to a maximum value of, for example, 200 bar.

In the brake system 1' illustrated in FIG. 2, the automatically controlled stationary braking mode is, for example, contemplated. Once the vehicle has come to a halt and the driver has actuated the brake pedal 2 once more with an increased force within the time period δt or indicated his or her desire for automatic stationary braking operation by actuating a switch, the brake booster 14 is activated, by driving the brake-pressure control valve 37, into an automatic brake-pressure build-up by the tandem master cylinder 13. As a result, brake pressure is coupled into the brake circuits I, II via the change-over valves 83, 84, which are in the initial position. The brake pressure which can be achieved thereby corresponds to the absolute value that can be achieved by driving the brake booster without the cooperation of the driver, i.e. actuation of the brake pedal 2.

After this initial brake-pressure build-up, the change-over valves 83, 84 are switched to their shut-off position I and, at the same time or with a slight delay relative thereto, the precharging control valves 103, 104 are switched to their throughflow position I and the high-pressure pumps 93, 98 are switched to the pressure-producing mode. The brake pressure coupled into the wheel brakes 7, 8, 9 and 11 is thereby increased further until the maximum value specified for the pressure-limiting function of the change-over valves 83, 84 is achieved.

After a time period of, for example, 0.2 to 0.5 seconds, after which it can be assumed with certainty that the pressure limit value has been achieved, the pumps 93, 98 are switched off again and the precharging control valves 103, 104 via which brake fluid can be fed to the high-pressure pumps 93, 98 at a sufficiently high prepressure, are switched back to their initial shut-off position 0. The driving of the brake-pressure control valve 37 of the brake booster 14 can be cancelled because the master cylinder 13 is shut off from the brake circuits I, II. After a time period of, for example, 1 to 2 minutes, the brake booster 14 is activated again to provide a pressure build-up actuation of the master cylinder 13. The precharging control valves 103, 104 are switched into their throughflow position I and the high-pressure pumps 93, 98 are switched back into the pumping mode in order to raise the pressure in the wheel brakes back to the maximum value provided by the pressure limitation. Brief pressure-raising cycles of this kind are repeated periodically for as long as the vehicle is stationary.

If the brake circuits I, II are fitted with pressure sensors, e.g. pressure sensors 108 assigned individually to the wheel brakes, which are provided for a vehicle-dynamic control mode possible with the brake system 1', their output signals can be used for control of pressure-raising cycles as required. Consequently, such cycles start when a minimum pressure value is undershot and ended again before the pressure limit value is reached in order to keep to a minimum, overall, noise development due to such pressure-raising cycles.

To end the automatically controlled holding braking mode, which takes place in accordance with the same criteria as explained with reference to the embodiment of FIG. 1, the change-over valves 83, 84 are switched in a pulsed manner between their shut-off positions I and their throughflow position 0, resulting in a stepwise brake-pressure reduction. It is within the scope of the present invention for the brake booster 14 to be reactivated in a short introductory phase of the brake-pressure reduction in order initially to reduce the pressure difference between the output pressure spaces of the master cylinder 13 and the brake circuits I, II and to mitigate pressure surges due to excessive pressure differences.

With a view to as rapid as possible pressure dissipation for the ending of the automatic holding braking operation, the present invention also uses the high-pressure pumps 93, 98 in their return-pumping mode, with valves 24 of the wheel brakes being switched to their shut-off positions I and the outlet valves 26 of the valve block 82 being switched to their throughflow positions I. A pressure reduction mode corresponding to the pressure reduction mode of the anti-lock control system is thus achieved, for which purpose the change-over valves 83, 84 are set to their shut-off positions I to act as pressure-limiting valves and the precharging control valves 103, 104 are held in their initial positions 0 likewise constituting shut-off positions.

The brake system 1' of FIG. 2 is suitable both on vehicles with automatic transmission and on vehicles with manual transmission. If the automatic stationary braking operation is capable of being ended by actuating the accelerator pedal 3 on vehicles with a manual transmission, the additional condition must be met that the clutch pedal has been actuated with a minimum pedal travel, which amounts to, for example, 50% of the total clutch pedal travel and, as it were, marks the point of engagement at which the clutch begins to bite. The electronic control unit for the automatic stationary braking mode 4 to produce the drive signals, for the valves of the connection unit 32 and of the valve block 82, can be implemented by a person of ordinary skill in the electronic circuit art.

To explain cost-saving variant embodiments of a brake system which nevertheless provide the automatic stationary braking function explained with reference to FIGS. 1 and 2, the brake system 1' shown in FIG. 2, for a vehicle with a rear-axle drive, will be taken as a starting point.

If, under the preconditions stated, the precharging control valve 103 assigned to the front-axle brake circuit I is omitted, i.e. the brake system 1' modified so that no direct connection can be established between that pressure output 33 of the master cylinder 13 which is assigned to the front-axle brake circuit I and the low-pressure input 96 of the high-pressure pump 93 of the front-axle brake circuit I, a brake system results which can provide the automatic stationary braking function while both utilizing the front-wheel brakes 7 and 8 and the rear-wheel brakes 9 and 11. Raising the brake pressure up to a maximum value determined by the pressure-limiting function of the change-over valve 84 of the rear-axle brake circuit is, however, only possible at the rear-axle brake circuit. The brake system thus simplified is furthermore suitable for anti-lock control at all the wheel brakes and also for traction control (ASR) using the rear-wheel brakes, but is no longer capable of vehicle dynamics control because the wheel brakes 7, 8 of the nondriven, front wheels of the vehicle can no longer be activated independently of the actuation of the brake unit 12 by the driver.

The same applies mutatis mutandis for the case where the change-over valve 83 assigned to the front-axle brake I is also omitted and the connection unit 32 is configured so that the main brake line 88 at the front-axle brake circuit I is connected "directly" to that pressure output 33 of the master cylinder 13 which is assigned to the latter. Given such a configuration of the brake system, the automatic stationary braking function can then be achieved only via the wheel brakes 9, 11 of the driven vehicle wheels. This does not, however, indicate any significant functional limitation because, by an automatically controllable activation of the rear-wheel brakes of the service brake of the vehicle, at least those braking forces in the rear-axle brake circuit which can be achieved by an actuation of the parking brake can be developed, and the parking brake usually acts on the rear-wheel brakes of a road vehicle and which must be independent of the service brake.

This applies even if the precharging control valve 104 assigned to the rear-axle brake circuit II and the direct connection which can be established by the valve between that pressure output 34 of the tandem master cylinder 13 which is assigned to the rear-axle brake II and the low-pressure input 101 of the high-pressure pump 98 of the rear-axle brake circuit II is dispensed with. Although a brake system with what remains of the hydraulic unit thus configured is no longer capable of ASR, it still provides the anti-lock control function (ABS) in addition to the automatic stationary braking function.

On a road vehicle with an electrically driveable brake booster, the function of the initially explained automatic stationary braking operation can also be implemented with a low outlay relative to a "simple" brake system, i.e. a system in which there is neither the possibility of anti-lock control nor that of traction or vehicle dynamics control, merely by inserting between one of the pressure outputs 33, 34 and the main brake line 88 or 89 of the brake circuit I or II that can be supplied with brake pressure by this pressure outlet an electrically driveable change-over valve 83 or 84 with a nonreturn valve 106 or 107 connected in parallel with it. By switching the change-over valve 83 or 84 into its shut-off position, a high brake pressure can be maintained for a minimum time period in the brake circuit after having coupled this high brake pressure into the brake circuit I or II at the beginning of an automatically controlled stationary braking operation.

In an advantageous configuration, the capacity of the brake pressure control device for continuation of the automatic holding braking operation is maintained even if the driver switches the engine off, in order, for example, to avoid unnecessary fuel consumption. This operation is only ended once the driver has actuated the parking brake independent of the service brake or, in the case of a vehicle with automatic transmission, has moved the selector lever to the "Park" position and removed the ignition key. That is, a combination of signals to be evaluated by the electronic control unit 4 is present to allow the electronic control unit 4 to recognize unambiguously that the vehicle is safely parked.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for automatic actuation of a hydraulic brake system of a road vehicle for maintaining the road vehicle in a stationary condition throughout traffic-related stationary phases by coupling automatically brake pressure from a brake-pressure source actuatable without driver intervention into at least one wheel brake of the road vehicle, comprising a brake-pressure control device configured to process sensor output signals of a sensor arrangement in accordance with predetermined actuation criteria while an engine of the road vehicle is running and with the road vehicle in the stationary condition achieved after a braking operation, and to provide automatic continuation of a stationary braking operation, in which, after a delay time period of defined length after the road vehicle has come to a stop has passed, a brake pressure sufficient to keep the vehicle reliably in the stationary condition is adapted to be coupled into the at least one wheel brake used for the stationary braking operation, and when driving is resumed, is detectable from a selected combination of the sensor output signals, controls release of the at least one wheel brake previously used for the stationary braking operation, wherein the brake-pressure control device is configured to trigger the automatic stationary braking operation only if, within the delay time period, the driver performs an actuating action which can be recognized as a driver's desire for triggering of automatic stationary braking and is detectable by the sensor arrangement, and provides termination of the automatic stationary braking mode only if, in addition to the sensor output signals of the sensor arrangement which reveal the driver's desire for resumption of the driving mode, there are also present sensor output signals which, again with reference to the predetermined actuation criteria, fulfill safety-relevant secondary conditions.

2. The device according to claim 1, wherein at least one brake circuit is provided with a solenoid valve driveable by output signals of an electronic control unit to shut the at least one brake circuit off from an associated pressure output of a brake unit.

3. The device according to claim 2, wherein at least one change-over valve is operational, associated with the electronic control unit which is configured to produce, after the expiration of a time period sufficient for the brake-pressure build-up in the automatic stationary braking mode, a signal for driving the at least one change-over valve into a shut-off position and to end a brake-pressure build-up mode.

4. The device according to claim 3, wherein the at least one change-over valve is switchable to control brake pressure reduction.

5. The device according to claim 4, wherein, upon a transition from the stationary braking mode to the driving mode, the electronic control unit is configured to first produce a control signal which raises output pressure of the brake unit and only thereafter to produce a sequence of pulses which drives the at least one change-over valve to control the brake-pressure reduction.

6. The device according to claim 2, wherein a hydraulic auxiliary pressure source is actuatable by an output signal of the electronic control unit and has an output pressure coupleable into at least one brake circuit of the brake system for the duration of the automatic stationary braking mode of said system.

7. The device according to claim 6, wherein the at least one wheel brake is configured such that the pressure admitted into the at least one wheel brake for the the automatically controlled holding braking mode is limited to a defined value characteristic of a partial braking mode of the brake system.

8. The device according to claim 2, wherein means driven by an output signal of the electronic control unit is provided for mechanically activating one of a parking brake and at least one wheel brake individually for the duration of the automatically controlled stationary braking operation.

9. The device according to claim 1, wherein, upon initiation of an automatic stationary braking mode, the brake pressure control device is operative to generate a speed signal which triggers an automatic brake pressure increase until the stationary condition of the road vehicle again occurs.

10. The device according to claim 9, wherein the brake-pressure increase takes place in steps of about 5 bar.

11. The device according to claim 10, wherein the brake pressure control device is further operative to cause, after the stationary condition of the vehicle again occurs by one additional brake-pressure raising step.

12. The device according to claim 1, wherein the brake-pressure control device triggers an automatic holding braking mode when a brake-pressure increase occurs within the delay time period after onset of the stationary condition of the road vehicle.

13. The device according to claim 12, wherein a brake-pressure increase of at least 5 bar is required within the delay time period to trigger the automatic stationary braking mode.

14. The device according to claim 1, wherein an automatic stationary braking mode is triggerable within a delay time period by manual actuation of an electric switch.

15. The device according to claim 1, wherein the delay time period within which the stationary braking mode is triggerable is between 1.5 and 5 seconds.

16. The device according to claim 1, wherein a sensor is configured to monitors a position of a vehicle hood and whose output signal characteristic of an open hood presents an activation of the automatic stationary braking mode and is operatively associated with the brake pressure control device.

17. The device according to claim 1, wherein a sensor assigned to the driver's seat is operatively associated with the brake pressure control device and has an output signal characteristic of an unoccupied driver's seat to prevent deactivation of an automatic holding braking mode.

18. The device according to claim 1, wherein a door position sensor for at least the driver's door is operatively associated with the brake pressure control device and has an output signal characteristic of an open door to prevent deactivation of the automatic stationary braking mode.

19. The device according to claim 1, wherein a solenoid-valve arrangement is operatively associated with the brake pressure control device such that the wheel brakes used for the automatic stationary braking mode of the brake system are adapted to be shut off from a master cylinder of the brake system for the duration of the stationary braking mode.

20. The device according to claim 1, the road vehicle is equipped with a brake booster configured to act on a master cylinder of the brake system and to activate a service brake system in the automatic stationary braking mode.

21. The device according to claim 1, wherein the road vehicle is equipped with an anti-lock system having at least one return pump and associated brake-pressure regulating valves an operatively arranged to be driven into the pressure reduction mode for a minimum time period to end the automatic stationary braking mode.

22. The device according to claim 1, wherein the brake-pressure control device is configured to reduce brake-pressure in steps of approximately 5 bar when ending the automatic stationary braking mode.

23. Method for automatic actuation of a hydraulic brake system of a road vehicle for maintaining the road vehicle in a stationary condition for the duration of traffic-related stationary phases, comprising the steps of coupling automatically brake pressure into at least one wheel brake of the road vehicle; processing sensor output signals of a sensor arrangement in accordance with predetermined criteria while an engine of the road vehicle is running and with the vehicle in a stationary condition achieved after a braking operation to provide automatic continuation of the stationary braking operation; coupling, after a delay time period of defined length after the vehicle has come to a stop has passed, a brake pressure sufficient to keep the road vehicle reliably in the stationary condition into the at least one wheel brake used for the stationary braking operation; detecting when driving is resumed from a selected combination of the sensor output signals; controlling the release of the at least one wheel brake previously used for the stationary braking operation when driving is resumed; triggering the automatic stationary braking operation only if, within the delay time period, the driver performs an actuating action which can be recognized as a driver's desire for triggering of automatic stationary braking; and providing the ending of the automatic stationary braking mode only if, in addition to the sensor output signals of the sensor arrangement which reveal the driver's desire for resumption of the driving mode, sensor output signals are present which, again with reference to the predetermined criteria, fulfill safety-relevant secondary conditions.

24. The method according to claim 23, wherein the redundant combination for detecting the resumption of driving comprises the output-signal of an accelerator-pedal position transmitter and a throttle-valve position sensor and an engine speed sensor.

\* \* \* \* \*